United States Patent
Asano

(10) Patent No.: US 9,621,534 B2
(45) Date of Patent: Apr. 11, 2017

(54) AUTHENTICATION APPARATUS, AUTHENTICATION SYSTEM, AUTHENTICATION METHOD AND STORAGE MEDIUM

(71) Applicant: CANON KABUSHIKI KAISHA, Tokyo (JP)

(72) Inventor: Ayumu Asano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/728,012

(22) Filed: Jun. 2, 2015

(65) Prior Publication Data

US 2015/0295912 A1    Oct. 15, 2015

Related U.S. Application Data

(63) Continuation of application No. 13/893,422, filed on May 14, 2013, now Pat. No. 9,083,530.

(30) Foreign Application Priority Data

May 29, 2012  (JP) ................................ 2012-122399

(51) Int. Cl.
    *H04L 29/06*    (2006.01)
    *H04L 9/32*     (2006.01)
    *H04L 29/08*    (2006.01)

(52) U.S. Cl.
    CPC ............ *H04L 63/08* (2013.01); *H04L 9/32* (2013.01); *H04L 63/12* (2013.01); *H04L 67/02* (2013.01)

(58) Field of Classification Search
    CPC ... H04L 63/08; H04L 63/0815; H04L 63/083; H04L 63/12; H04L 63/123; H04L 9/32; H04L 9/3205; H04L 9/3223
    See application file for complete search history.

(56) References Cited

U.S. PATENT DOCUMENTS

2005/0268108 A1* 12/2005 Mehra ................. G06F 21/33
                                                 713/182
2006/0236387 A1* 10/2006 Ballinger ............... H04L 63/08
                                                 726/14

(Continued)

FOREIGN PATENT DOCUMENTS

JP     2009-123059 A     6/2009
JP     2009-223739 A    10/2009

OTHER PUBLICATIONS

ONVIF Core Specification—Version 2.1, ONVIF, Jun. 2011, pp. 30-34.
ONVIF Core Specification, Version 2.2, May 2012, pp. 30-31.

*Primary Examiner* — Minh Dinh
(74) *Attorney, Agent, or Firm* — Fitzpatrick, Cella, Harper & Scinto

(57) ABSTRACT

The first authentication unit of an authentication apparatus decides whether first authentication data exists in a received message, and performs, if it is decided that the first authentication data exists, authentication based on the first authentication data. The second authentication unit of the authentication apparatus decides whether second authentication data exists in the received message, and performs, if it is decided that the second authentication data exists, authentication based on the second authentication data. If the second authentication unit decides that no second authentication data exists in the received message, and the first authentication unit decides that authentication has succeeded, it is decided that authentication for the received message has succeeded.

18 Claims, 6 Drawing Sheets

(56) References Cited

U.S. PATENT DOCUMENTS

2007/0011322 A1    1/2007   Moiso
2010/0241857 A1    9/2010   Okude et al.

* cited by examiner

AUTHENTICATION APPARATUS, AUTHENTICATION SYSTEM, AUTHENTICATION METHOD AND STORAGE MEDIUM

BACKGROUND OF THE INVENTION

Field of the Invention

The present invention relates to an authentication apparatus, system, and method using a plurality of authentication schemes.

Description of the Related Art

A mechanism of authenticating a user or device using a plurality of pieces of authentication information is known. There are provided, for example, a technique for ensuring high security using a plurality of pieces of authentication information, and a technique of improving the usability by only performing a first authentication step after a plurality of authentication steps are performed once.

U.S. Publication No. 2010/0241857 describes a system in which for each mobile terminal first authentication information unique to it and second authentication information generated for it are used, and if authentication using the first authentication information succeeds, communication with the mobile terminal is allowed and authentication processing using the second authentication information is executed.

Japanese Patent Laid-Open No. 2009-223739 describes an authentication apparatus including a first authentication unit for using an application installed on a terminal device, and a second authentication unit for using an external service. The authentication apparatus described in Japanese Patent Laid-Open No. 2009-223739 simplifies a user login operation using an authentication code obtained when authentication by the first authentication unit and that by the second authentication unit both succeed.

Furthermore, ONVIF Core Spec. Ver. 2.2 pp. 30-31 discloses a method of using two authentication schemes including HTTP digest authentication and WS-Security to maintain compatibility with an authentication scheme used in the previously released ONVIF specification.

In ONVIF Core Spec. Ver. 2.2 pp. 30-31, it is required to check the presence/absence of authentication information for HTTP digest and that for WSS (WS-Security) in a Web server. In ONVIF Core Spec. Ver. 2.2 pp. 30-31, if authentication information for WSS is included, even if no authentication information for HTTP digest authentication is included, authentication processing is executed using only the authentication information for WSS without performing HTTP digest authentication.

To check the presence/absence of authentication information for WSS in the Web server, it is necessary to analyze an HTML body, thereby imposing a high processing load.

SUMMARY OF THE INVENTION

The present invention provides a technique of improving the usability of authentication and reducing the load of authentication processing.

Furthermore, the present invention provides an authentication apparatus or a system comprising: a first authentication unit configured to decide whether first authentication data exists in a received message, and perform, if it is decided that the first authentication data exists, authentication based on the first authentication data; and a second authentication unit configured to decide whether second authentication data exists in the received message, and perform, if it is decided that the second authentication data exists, authentication based on the second authentication data, wherein if the second authentication unit decides that no second authentication data exists in the received message, and the first authentication unit decides that authentication has succeeded, it is decided that authentication for the received message has succeeded.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
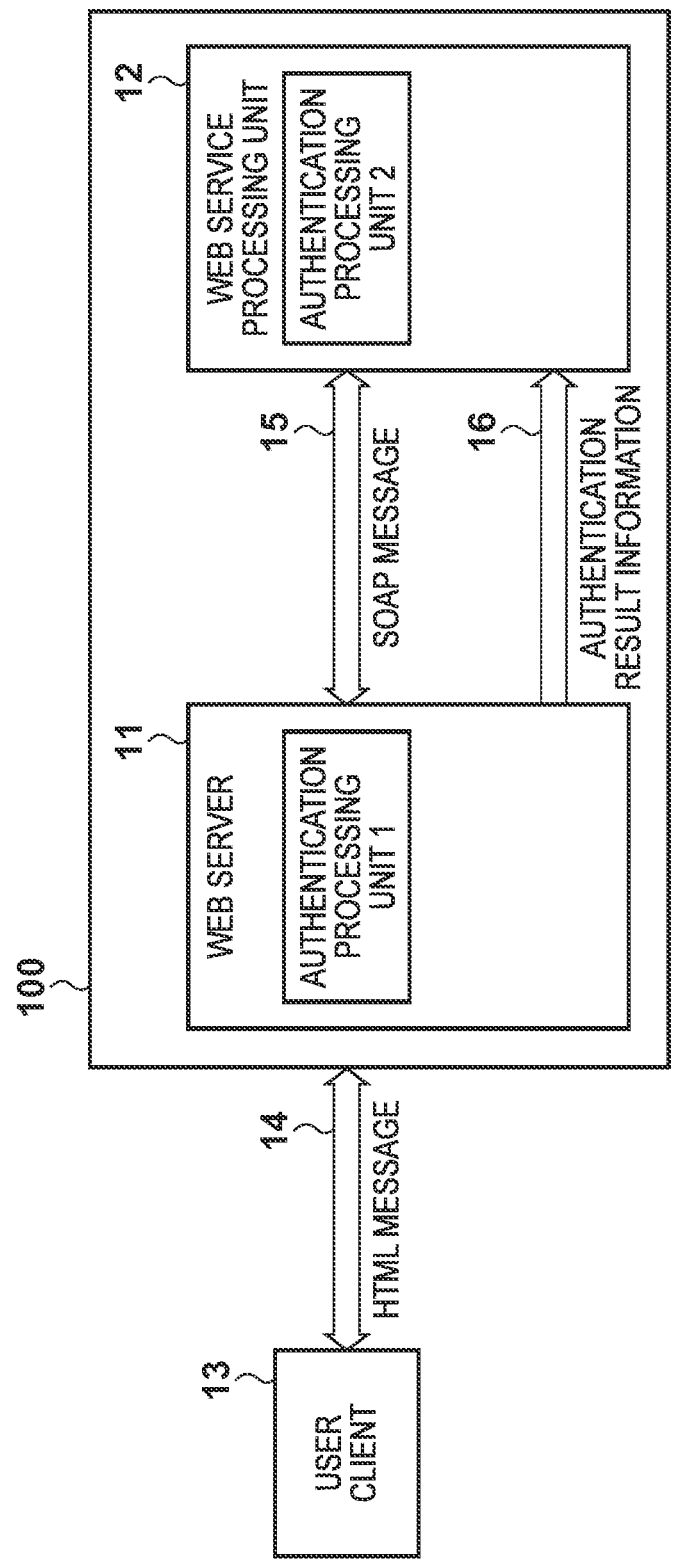
FIG. 1 is a view showing the configuration of a Web service system.

FIG. 1 shows the configuration of a Web service system according to an embodiment. The Web service system includes a network apparatus 100 and a user client 13. The network apparatus 100 is, for example, a network camera or a computer on a network. The user client 13 is, for example, a personal computer (PC), and communicates with the network apparatus 100 via a network such as the Internet or a LAN.

Figure 6:
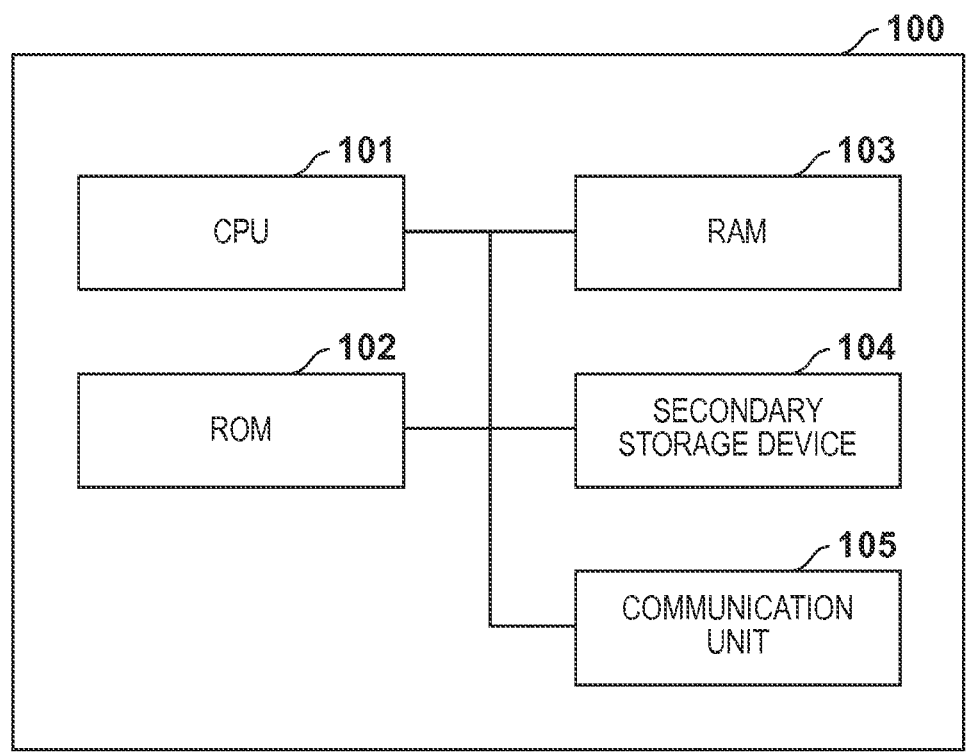
FIG. 6 is a schematic block diagram showing a computer implementing a network apparatus.

The functions of the network apparatus 100 (to be described below) are implemented by a computer integrated in the network apparatus 100 which includes a CPU 101, a ROM 102, a RAM 103, a secondary storage device 104, and a communication unit 105, as shown in FIG. 6. In the computer, the CPU 101 executes programs associated with a method of the present invention, which are recorded in the ROM 102. Information such as a SOAP message and authentication result information 16 is then stored in the RAM 103 or secondary storage device 104. The communication unit 105 is used to communicate with the user client 13 or the like. Note that the network apparatus 100 may include dedicated hardware for executing each function (to be described below), or execute some functions by hardware and the remaining functions by the computer.

The network apparatus 100 is an apparatus for providing a Web service, and includes, for example, a Web server 11 serving as a Web server function unit and a Web service processing unit 12 serving as a function unit for providing the Web service, as shown in FIG. 1. An authentication processing unit 1 of the Web server 11 and an authentication processing unit 2 of the Web service processing unit 12 together constitute a user authentication system. The Web server 11 accepts a request for the Web service by an HTML message 14 from the user client 13 via the network such as the Internet or a LAN.

The authentication processing unit 1 executes HTML digest authentication that is an HTML user authentication mechanism. The authentication processing unit 1 determines the presence/absence of authentication information for HTML digest authentication, and executes authentication processing, thereby generating authentication result information 16. The Web server 11 then generates a SOAP message 15 based on the HTML message 14, and causes a transmission unit (not shown) to transmit the SOAP message 15 to the Web service processing unit 12. Note that the SOAP message 15 includes at least partial information (for example, a body) constituting the HTML message 14 and the Web server 11 does not analyze the SOAP message (the body of the HTML message 14).

The Web service processing unit 12 is a module for performing processing of the Web service, and includes the authentication processing unit 2 for performing WS-Security (WSS) authentication that is a user authentication mechanism for the Web service. The authentication processing unit 2 includes an engine for analyzing the SOAP message 15 described in XML, thereby determining the presence/absence of authentication information for WSS authentication and executing authentication processing. The Web service processing unit 12 processes a request for the Web service from the user client 13, and transmits a processing result to the user client 13 via the Web server 11.

Figure 2:
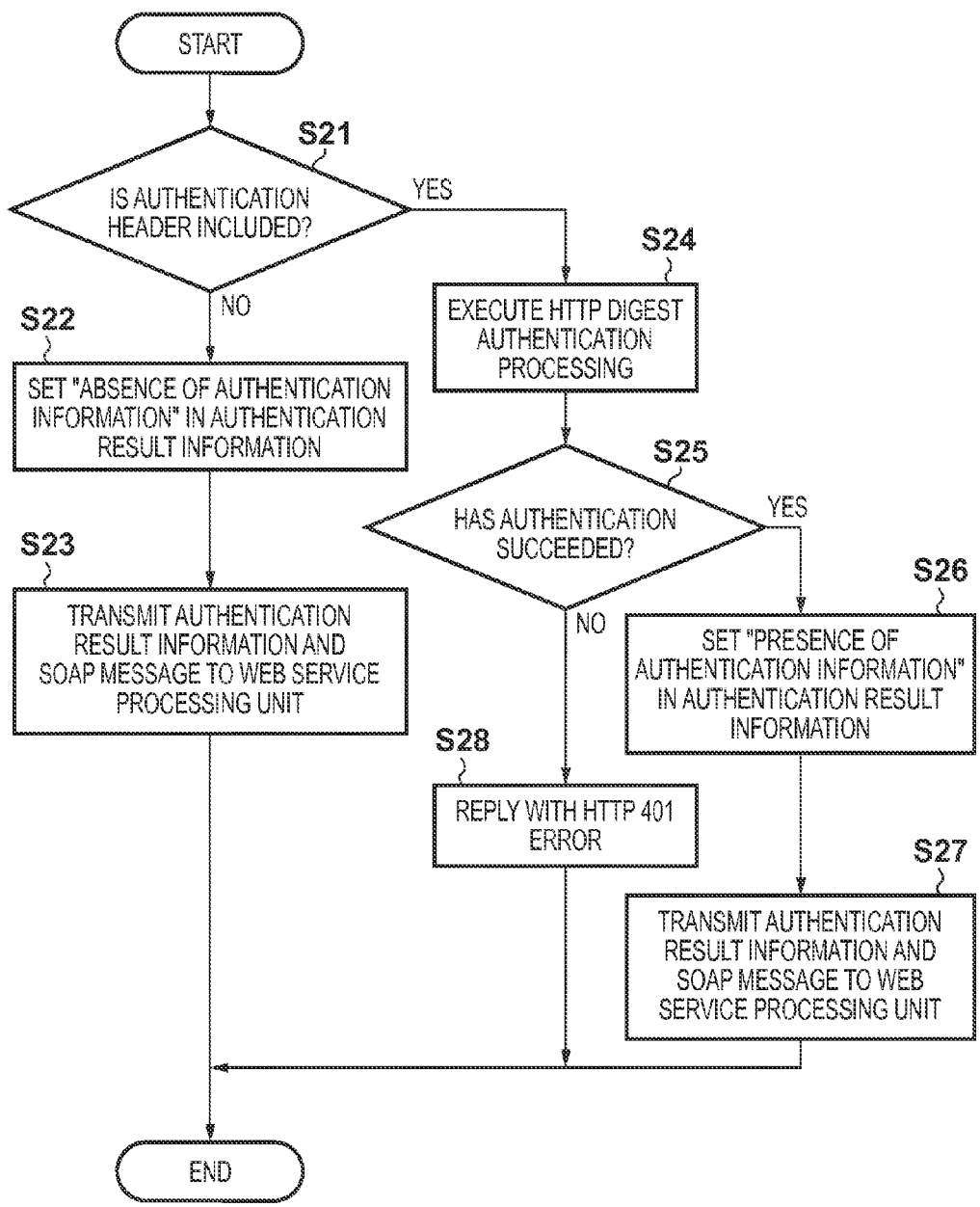
FIG. 2 is a flowchart illustrating authentication processing by a Web server according to the first embodiment.

FIG. 2 is a flowchart illustrating details of the processing of the authentication processing unit 1 within the Web server 11. The processing of the authentication processing unit 1 is implemented when the CPU 101 as a computer reads out a computer program stored in the ROM 102, and executes it.

Upon receiving the HTML message 14 from the user client 13, the Web server 11 analyzes the HTML message, and determines whether an authentication header for HTTP digest authentication is included (step S21). If no authentication header for HTTP digest authentication is included (NO in step S21), the Web server 11 generates authentication result information 16 by setting "absence of authentication information" (step S22). The Web server 11 transmits the authentication result information 16 and SOAP message 15 to the Web service processing unit 12 via, for example, a bus within the network apparatus 100 (step S23).

If it is determined that an HTTP digest authentication header is included (YES in step S21), the Web server 11 executes HTTP digest authentication processing (step S24). The Web server 11 determines the result of the HTTP digest authentication processing (step S25). If the processing has succeeded (YES in step S25), the Web server 11 generates authentication result information 16 by setting "presence of authentication information" (step S26). After that, the authentication result information 16 and SOAP message 15 are transmitted to the Web service processing unit 12 via, for example, the bus within the network apparatus 100 (step S27).

On the other hand, if the HTTP digest authentication processing has failed (NO in step S25), the Web server 11 returns an HTTP 401 error (Unauthorized) to the user client 13, thereby notifying it that the HTTP digest authentication processing has failed (step S28).

In the embodiment, if there is no authentication information for HTTP digest authentication, it is not prompted to add HTTP digest authentication information by notifying the user client 13 of the HTTP 401 error. In the embodiment, as shown in step S23, no HTTP digest authentication is performed, and the Web service processing unit 12 executes processing (to be described below), and determines whether to notify the user client of the HTTP 401 error. The Web server 11 does not analyze authentication information for WSS authentication.

That is, the Web server 11 only determines whether there is an authentication header for HTTP digest authentication or whether authentication has succeeded if there is authentication information for HTTP digest authentication, and transmits the determination result as contents of authentication result information to the Web service processing unit 12.

Figure 3:
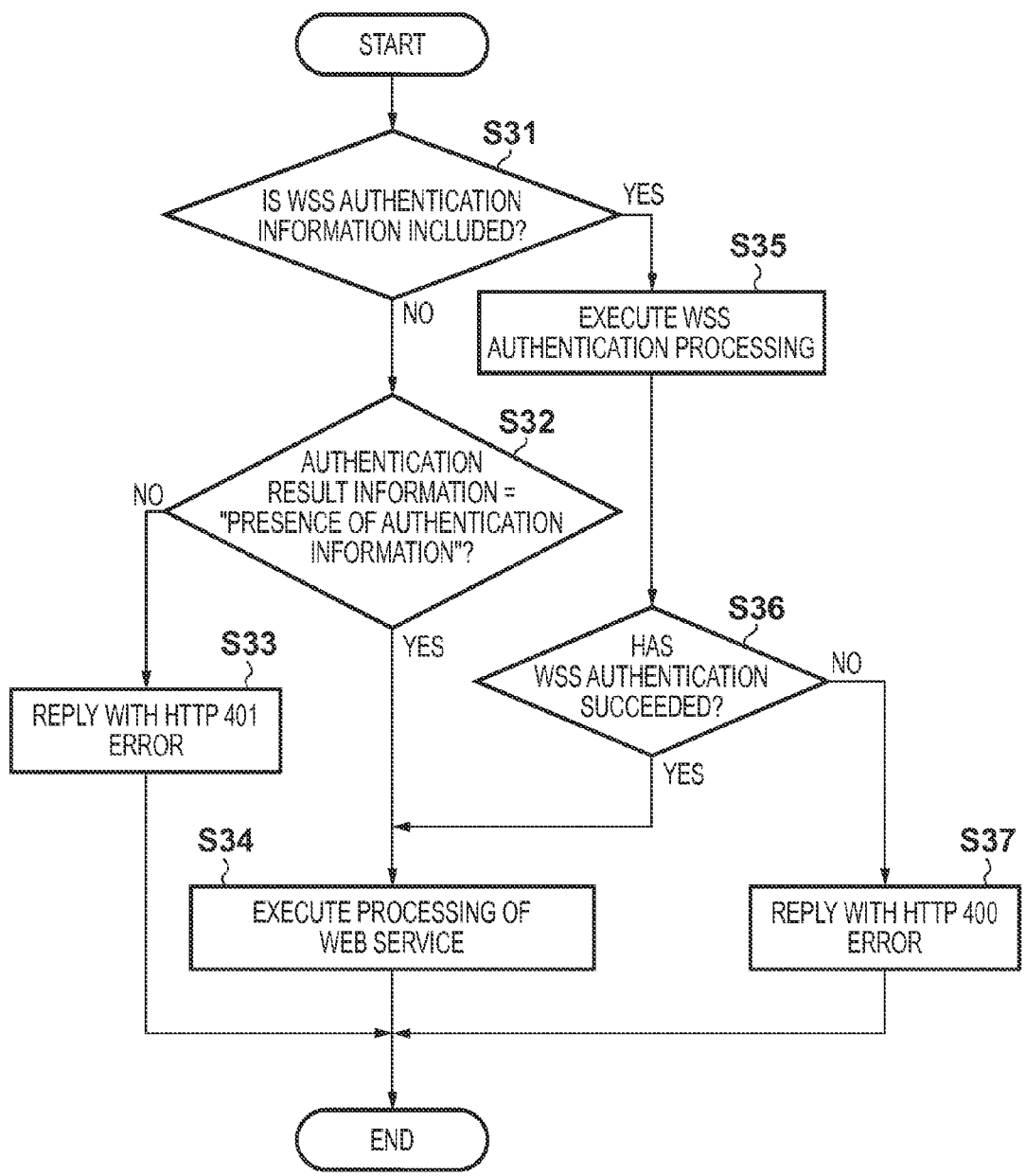
FIG. 3 is a flowchart illustrating processing by a Web service processing unit according to the first embodiment.

The authentication processing by the Web service processing unit 12 will be described next. FIG. 3 is a flowchart illustrating details of the processing of the authentication processing unit 2 within the Web service processing unit 12. The processing of the authentication processing unit 2 is implemented when the CPU 101 as a computer reads out a computer program stored in the ROM 102, and executes it.

The Web service processing unit 12 analyzes the SOAP message 15 acquired from the Web server 11, and determines whether WS-Security authentication information (WSS authentication information) is included (step S31). If there is no WSS authentication information (NO in step S31), the Web service processing unit 12 determines whether the authentication result information 16 acquired from the Web server 11 indicates "presence of authentication information" (step S32). If the authentication result information 16 indicates "presence of authentication information" (YES in step S32), HTTP digest authentication has succeeded in the Web server 11. The Web service processing unit 12 thus allows the use of the Web service without performing WSS authentication, and executes processing of the Web service (step S34).

If the authentication result information 16 indicates "absence of authentication information" (NO in step S32), neither HTTP digest authentication information nor WSS authentication information exists, and thus the Web service processing unit 12 replies with an HTTP 401 error (step S33). The HTTP 401 error is transferred to the user client 13 via the Web server 11. This can prompt the user client 13 to send a request by including authentication information for HTTP digest authentication in an HTML message.

On the other hand, if it is determined in step S31 that WSS authentication information is included (YES in step S31), the Web service processing unit 12 executes WSS authentication processing (step S35). The Web service processing unit 12 determines whether WSS authentication has succeeded (step S36). If WSS authentication has succeeded (YES in step S36), this means that both HTTP digest authentication and WSS authentication have succeeded. The Web service processing unit 12, therefore, allows the use of the Web service, and executes processing of the Web service (step S34).

On the other hand, if it is determined that WSS authentication has failed (NO in step S36), this means that HTTP digest authentication has succeeded but WSS authentication has failed. In this case, the Web service processing unit 12 notifies the user client 13 of an HTTP 400 error (Bad Request) indicating that WSS authentication has failed (step S37). The HTTP 400 error is transferred to the user client 13 via the Web server 11.

Note that although the user client is notified of the HTTP 401 error in step S33, it may be notified of an error (401 Unauthorized) by a SOAP message in addition to the HTTP 401 error. This error notification indicates that HTTP digest authentication has failed but whether to interpret the error of the SOAP message is up to the user client 13.

Furthermore, although the user client is notified of the HTTP 400 error in step S37, it may be notified of an error (ter: Unauthorized) by a SOAP message in addition to the HTTP 400 error. This error notification indicates that WSS authentication has failed but whether to interpret the error of the SOAP message is up to the user client 13.

According to ONVIF Core Spec. Ver. 2.2 pp. 30-31, before and after performing HTTP digest authentication, it is necessary to determine whether WSS authentication information is included and, therefore, it is required to provide a mechanism of checking WSS authentication information within the Web server. According to this embodiment, however, the Web server 11 for performing HTTP digest authentication generates authentication result information 16 and sends it to the Web service processing unit 12 without determining whether WSS authentication information is included. This eliminates the need to analyze the HTML body to check the presence/absence of WSS authentication information within the Web server 11, thereby reducing the load on the Web server 11.

The second embodiment will be described with reference to FIGS. 4 and 5. A system configuration according to this embodiment is the same as that of the first embodiment shown in FIGS. 1 and 6 except that additional functions are provided in a Web server 11 and Web service processing unit 12. The additional functions of the Web server 11 and Web service processing unit 12 make settings of HTTP authentication and WSS authentication, consider a user client having a specific user authority, and skip authentication processing in a specific service. Especially if an HTTP authentication scheme is not digest authentication, user authentication is performed by WSS authentication, and thus an authentication processing unit 1 of the Web server 11 according to the embodiment generates authentication result information 16 by setting "absence of authentication information".

Figure 4:
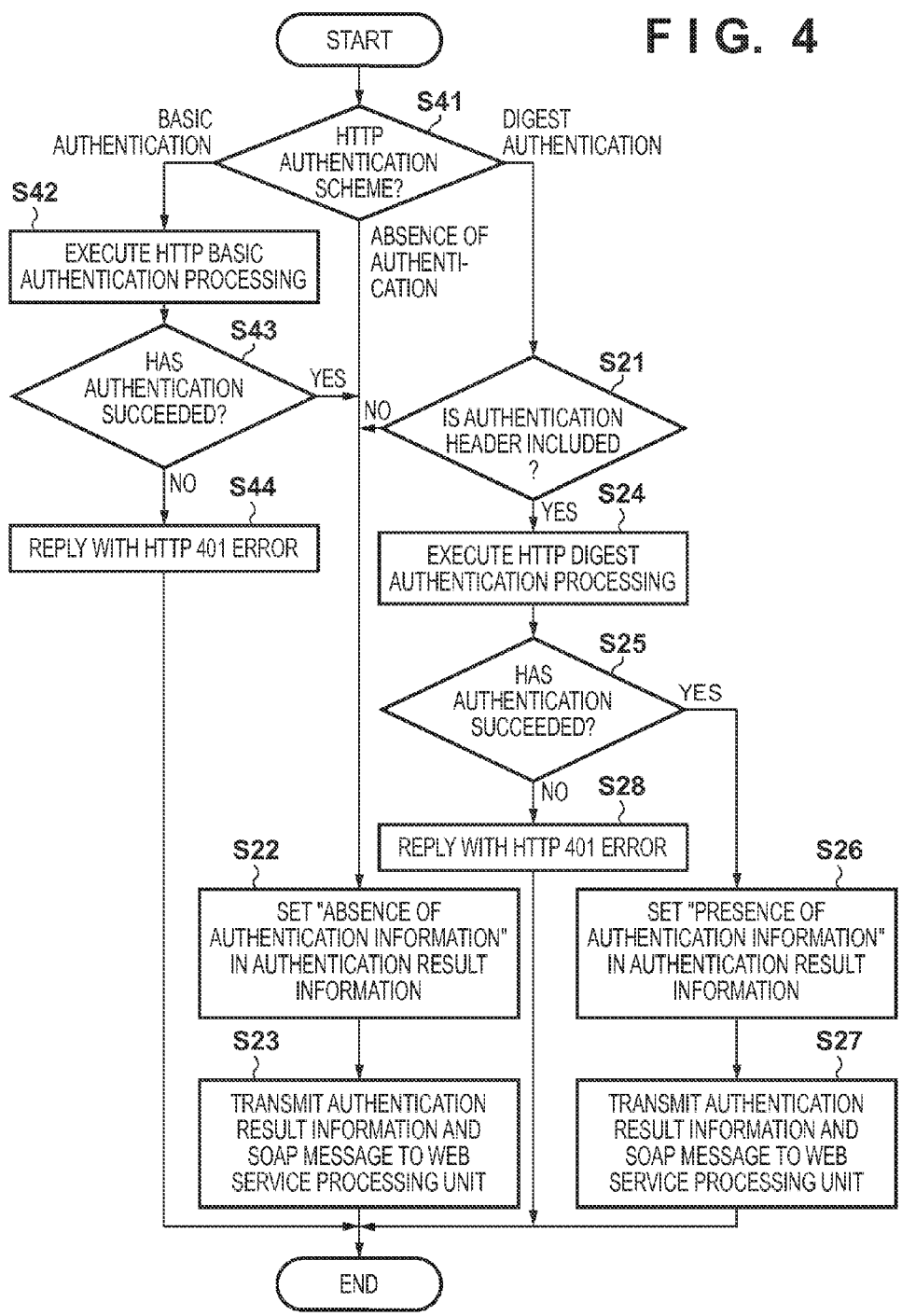
FIG. 4 is a flowchart illustrating authentication processing by a Web server according to the second embodiment.

FIG. 4 is a flowchart illustrating processing by the authentication processing unit 1, which is obtained by extending the flowchart shown in FIG. 2 to support an HTTP authentication scheme other than digest authentication in the Web server 11. The processing of the authentication processing unit 1 is implemented when a CPU 101 as a computer reads out a computer program stored in a ROM 102, and executes it. The administrator of a network apparatus 100 decides, in advance, an HTTP authentication scheme to be supported as a setting of the Web server 11. This setting is stored in a secondary storage device 104.

Upon start of the processing, the Web server 11 determines an HTTP authentication scheme set in an HTML message 14 (step S41). If the Web server 11 determines that the HTTP authentication scheme is "digest authentication" as an authentication scheme using authentication information, it advances the process to step S21, and then executes the same processing as the authentication processing described in the first embodiment (FIG. 2).

On the other hand, if the Web server 11 determines in step S41 that the HTTP authentication scheme is "absence of authentication", it generates authentication result information 16 by setting "absence of authentication information" (step S22). The Web server 11 transmits the authentication result information 16 and a SOAP message 15 to the Web service processing unit 12 via, for example, a bus within the network apparatus 100 (step S23). In this case, only WSS authentication in the Web service processing unit 12 is executed as authentication processing.

If the Web server 11 determines in step S41 that the HTTP authentication scheme is "basic authentication", it executes HTTP basic authentication processing (step S42), and determines whether the HTTP basic authentication has succeeded (step S43). If the HTTP basic authentication has succeeded (YES in step S43), the Web server 11 generates authentication result information 16 by setting "absence of authentication information" (step S22). The Web server 11 transmits the authentication result information 16 and SOAP message 15 to the Web service processing unit 12 via, for example, the bus within the network apparatus 100 (step S23).

On the other hand, if the Web server 11 determines that the HTTP basic authentication has failed (NO in step S43), it notifies a user client 13 of an HTTP 401 error (step S44), and prompts the user client 13 to add authentication information.

Note that in the above-described processing, if the authentication scheme set in the HTML message 14 is HTTP basic authentication, HTTP basic authentication is executed. This authentication processing, however, need not be executed. For example, if an authentication scheme other than HTTP digest authentication as an authentication scheme using authentication information has been set in the HTML message 14, "absence of authentication information" may be set in the authentication result information 16 without performing subsequent authentication. If an authentication scheme other than HTTP basic authentication has been set and the Web server 11 supports the set authentication scheme, the Web server 11 executes authentication by the authentication scheme. If the authentication succeeds, the Web server 11 may set "absence of authentication information" in the authentication result information 16.

Figure 5:
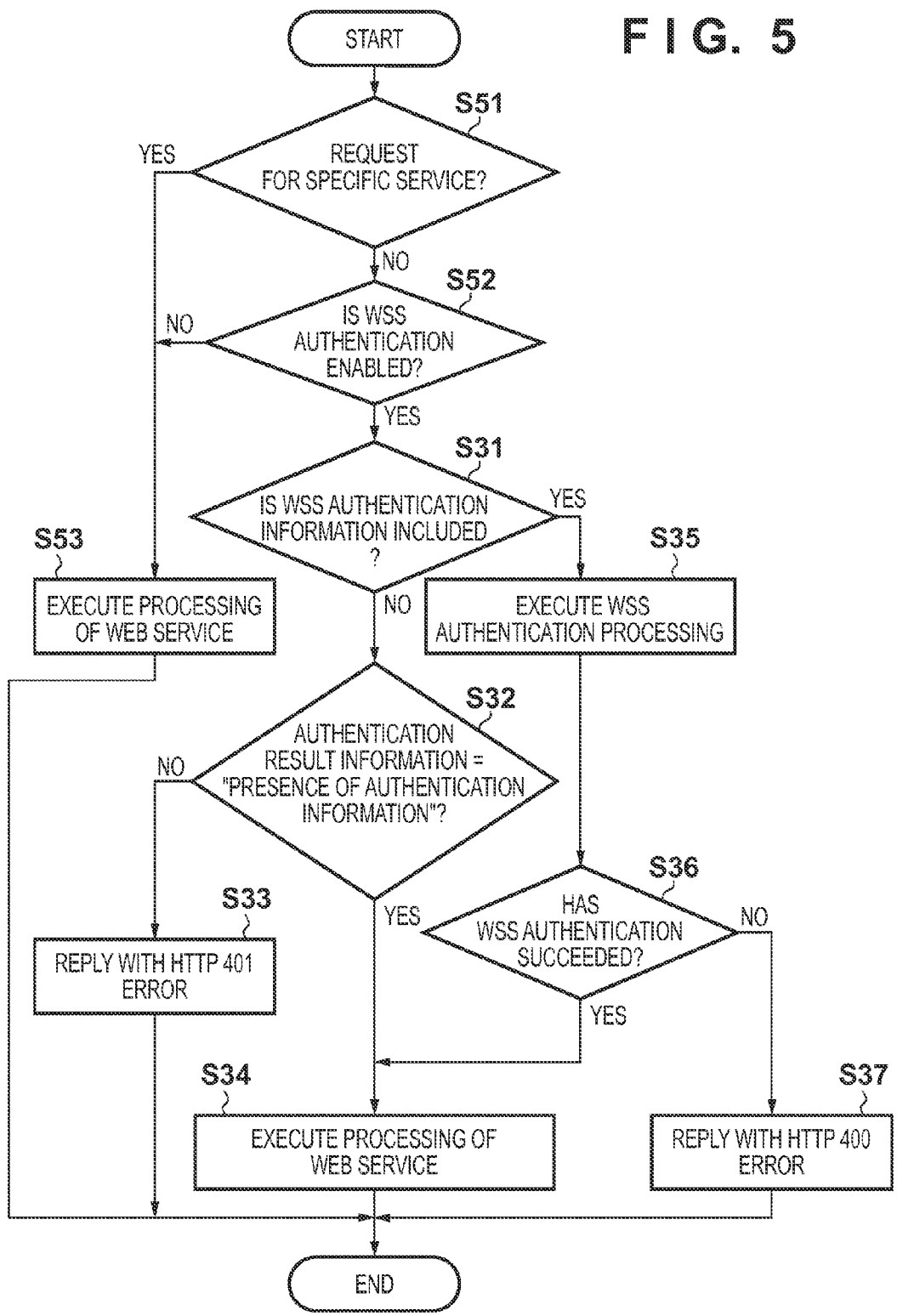
FIG. 5 is a flowchart illustrating processing by a Web service processing unit according to the second embodiment.

FIG. 5 is a flowchart illustrating the processing of the authentication processing unit 2, which is obtained by extending the flowchart shown in FIG. 3 in consideration of the fact that the Web service processing unit 12 can execute processing for a specific service and can set the user level and WSS authentication. The processing of the authentication processing unit 2 is implemented when the CPU 101 as a computer reads out a computer program stored in the ROM 102, and executes it.

The Web service processing unit 12 analyzes a SOAP message, and determines whether the SOAP message is a request for a specific service (step S51). Note that the specific service is, for example, a service which does not require user authentication such as provision of time information or function information of the network apparatus 100. If the SOAP message is a request for a service which does not require user authentication (YES in step S51), the Web service processing unit 12 allows the use of a Web service, and executes processing (step S53). If the SOAP message is transferred from the Web server 11 (step S23 or S27 of FIG. 4), the Web service processing unit 12 executes processing of the specific service regardless of the WSS authentication information or authentication result information 16 in the authentication processing unit 1.

If the SOAP message is a request not for a service which does not require user authentication but for a service which requires user authentication (NO in step S51), the Web service processing unit 12 determines whether WSS authentication is enabled in the network apparatus 100 (step S52). The administrator of the network apparatus 100 sets, in advance, enabling or disabling of WSS authentication. This setting is stored in the secondary storage device 104. If the Web service processing unit 12 determines that WSS authentication is enabled (YES in step S52), it advances the process to step S31, and then executes the same processing as that shown in FIG. 3 according to the first embodiment. If it is determined that WSS authentication is not enabled, the process advances to step S53.

In the above description, even if WSS authentication information is included and is not correct, the Web service processing unit 12 provides the Web service as long as WSS authentication is disabled. The present invention, however, is not limited to this. If, for example, WSS authentication is enabled and WSS authentication information is included, the Web service processing unit 12 may execute WSS authentication processing. If the authentication information is not correct, the Web service processing unit 12 may notify the user client of an HTTP 400 error without providing the Web service.

A function of determining that user authentication has failed if the user has no authority to use a service or the user is a specific user, regardless of the result of WSS authentication processing, will be described. For a service for changing important settings of the network apparatus 100 such as network settings, there is a demand for providing a service to only specific users or authorized users. To satisfy the demand, before the processing in step S34 or the processing in step S53 executed when WSS authentication is disabled, it may be determined whether the user client 13 has the authority to execute the Web service. If the user has no authority, he/she is notified of an HTTP 400 error without allowing the use of the Web service and executing processing.

ONVIF Core Spec. Ver. 2.2 pp. 30-31 describes an access control function of restricting a service by a request for a specific service or a user authority in addition to whether WSS authentication information is included. To execute this function, a mechanism is necessary to analyze the SOAP message in the Web server 11 to check which service has been requested by the SOAP message or check WSS authentication information. According to this embodiment, however, the Web server 11 for performing HTTP digest authentication or HTTP basic authentication transmits the authentication result information 16 to the Web service processing unit 12 without determining which service has been requested or whether WSS authentication information is included. This eliminates the need to analyze the HTML body to check which service has been requested or whether WSS authentication information is included, thereby enabling to reduce the load on the Web server 11.

Although the embodiments of the present invention have been described, the present invention is not limited to them. Various changes and modifications can be made within the spirit and scope of the present invention. For example, although the single network apparatus 100 includes the Web server 11 and the Web service processing unit 12 in the above description, these components may be included in different apparatuses. That is, a network system including an authentication apparatus corresponding to the Web server 11 including the authentication processing unit 1 and an authentication apparatus corresponding to the Web service processing unit 12 including the authentication processing unit 2 may be implemented.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a Continuation Application of U.S. application Ser. No. 13/893,422, with a filing date of May 14, 2013, which claims the benefit of Japanese Patent Application No. 2012-122399 filed on May 29, 2012, both of which are hereby incorporated by reference herein in their entireties.

What is claimed is:

1. A service processing apparatus comprising:
a server configured (i) to determine an authentication scheme used for a received message from a client, (ii) to generate an authentication result indicating that first authentication data does not exist in the received message, in a case where it is determined that the authentication scheme used for the received message is not a predetermined authentication scheme, and (iii) to generate an authentication result indicating whether first authentication data does or does not exist in the received message, based on whether or not predetermined data exists in the received message, in a case where it is determined that the authentication scheme used for the received message is the predetermined authentication scheme; and
a service processing unit configured to decide whether or not to execute a process for a service for the received message based on whether or not second authentication data exists in the received message and on the authentication result generated by the server.

2. The service processing apparatus according to claim 1, wherein the service processing unit performs authentication based on the second authentication data if the second authentication data exists in the received message,
wherein the service processing unit executes the process for the service for the received message if the authentication has succeeded.

3. The service processing apparatus according to claim 1, wherein the service processing unit executes the process for the service for the received message if the second authentication data does not exist in the received message but the authentication result indicates the first authentication data exists in the received message.

4. The service processing apparatus according to claim 1, wherein error notification to the client is executed if the authentication result indicates the first authentication data does not exist in the received message and the second authentication data does not exist in the received message.

5. The service processing apparatus according to claim 1, wherein the service processing apparatus is a network camera.

6. The service processing apparatus according to claim 1, wherein the predetermined authentication scheme is an HTTP digest authentication scheme.

7. A service processing method of a service processing apparatus having a server and a service processing unit, comprising:
   determining, by the server, an authentication scheme used for a received message from a client,
   generating, by the server, an authentication result indicating that first authentication data does not exist in the received message, in a case where it is determined that the authentication scheme used for the received message is not a predetermined authentication scheme;
   generating, by the server, an authentication result indicating whether the first authentication data does or does not exist in the received message, based on whether or not predetermined data exists in the received message, in a case where it is determined that the authentication scheme used for the received message is the predetermined authentication scheme; and
   deciding, by the service processing unit, whether or not to execute a process for
   a service for the received message based on whether or not second authentication data exists in the received message and on the generated authentication result.

8. The method according to claim 7, further comprising performing, by the service processing unit, authentication based on the second authentication data if the second authentication data exists in the received message, and
   executing, by the service processing unit, the process for the service for the received message if the authentication has succeeded.

9. The method according to claim 7, further comprising executing, by the service processing unit, a process for the service for the received message if the second authentication data does not exist in the received message but the authentication result indicates the first authentication data exists in the received message.

10. The method according to claim 7, wherein error notification to the client is executed if the authentication result indicates the first authentication data does not exist in the received message and the second authentication data does not exist in the received message.

11. The method according to claim 7, wherein the service processing apparatus is a network camera.

12. The method according to claim 7, wherein the predetermined authentication scheme is an HTTP digest authentication scheme.

13. A non-transitory storage medium storing a computer program, the computer program comprising codes to cause a service processing apparatus to:
   determine an authentication scheme used for a received message from a client,
   generate an authentication result indicating that first authentication data does not exist in the received message, in a case where it is determined that the authentication scheme used for the received message is not a predetermined authentication scheme;
   generate an authentication result indicating whether first authentication data does or does not exist in the received message, based on whether predetermined data exists in the received message, in a case where it is determined that the authentication scheme used for the received message is the predetermined authentication scheme; and
   decide whether or not to execute a process for a service for the received message based on whether or not second authentication data exists in the received message and on the generated authentication result.

14. The non-transitory storage medium according to claim 13, further comprising codes to cause the service processing apparatus to perform authentication based on the second authentication data if the second authentication data exists in the received message, and
   execute the process for the service for the received message if the authentication has succeeded.

15. The non-transitory storage medium according to claim 13, further comprising codes to cause the service processing apparatus to execute a process for the service for the received message if the second authentication data does not exist in the received message but the authentication result indicates the first authentication data exists in the received message.

16. The non-transitory storage medium according to claim 13, wherein error notification to the client is executed if the authentication result indicates the first authentication data does not exist in the received message and the second authentication data does not exist in the received message.

17. The non-transitory storage medium according to claim 13, wherein the service processing apparatus is a network camera.

18. The non-transitory storage medium according to claim 13, wherein the predetermined authentication scheme is an HTTP digest authentication scheme.

* * * * *